Feb. 26, 1935. W. F. SCHULZ Re. 19,480

PLASTER FOUNDATION

Original Filed Jan. 17, 1931

Inventor

Walter F. Schulz,

By

Attorney

Reissued Feb. 26, 1935 Re. 19,480

UNITED STATES PATENT OFFICE 19,480

PLASTER FOUNDATION

Walter F. Schulz, Youngstown, Ohio, assignor to Truscon Steel Company, Youngstown, Ohio, a corporation of Michigan Original No. 1,915,336, dated June 27, 1933, Serial No. 509,509, January 17, 1931. Application for reissue November 21, 1934, Serial No. 754,193

5 Claims. (Cl. 72—117)

One of the principal objects of the present invention is to provide a relatively inexpensive form of structure of that type in which a backing sheet and an overlying foraminous sheet are employed, with means of a sufficiently effective character to secure the two together so as to permit their mounting on studding, rafters or other supports, and holding the two in associated relation until plaster has been applied and has set.

A further object is to provide a structure of this character that eliminates the necessity of perforating the backing sheet with securing means, thereby obviating the places at which the moisture of the plaster can find access to the interior of the backing between the supports. In other words the necessity of breaking a waterproofed backing sheet at numerous points is eliminated.

The structure also obviates another serious difficulty. In the manufacture of these plaster bases, the plaster holding element is usually of expanded metal, and expanded metal is not and cannot always be produced with exact accuracy without material trouble and expense. The consequence is that the meshes will vary in size and shape, and where the expanded metal and board are united by machinery and staples are employed as the uniting agency, the lattice of the expanded metal will not always come accurately into place by reason of the aforesaid variations. In the present embodiment this serious difficulty is overcome and a structure can be produced by machinery, irrespective of discrepancies that may appear in the members.

Figure 1:
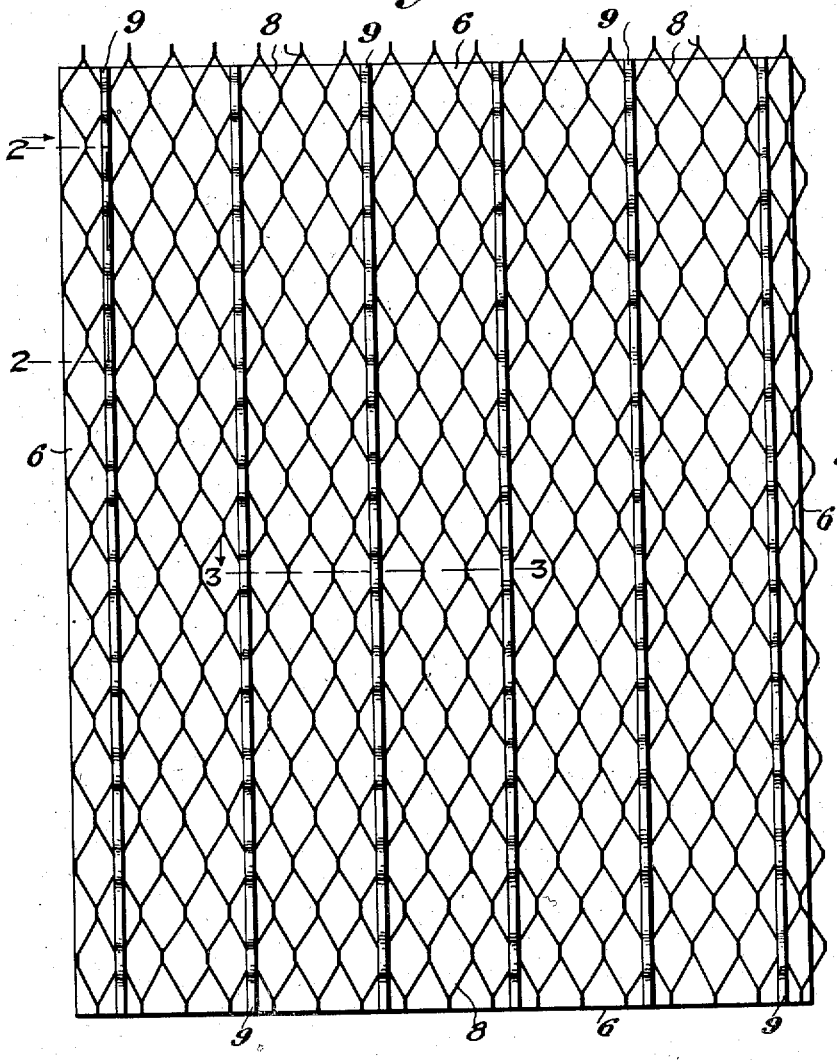

In the accompanying drawing:

Figure 1 is a view in elevation of a plaster base constructed in accordance with the present invention.

Figure 2:
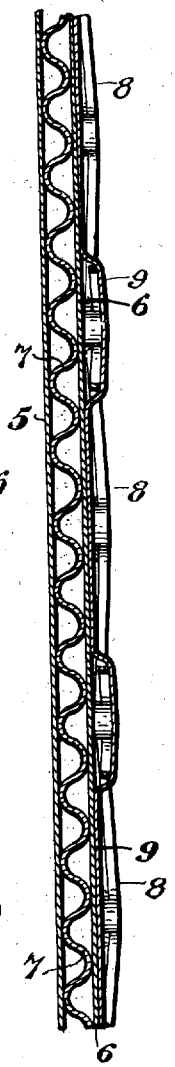
Figure 3:
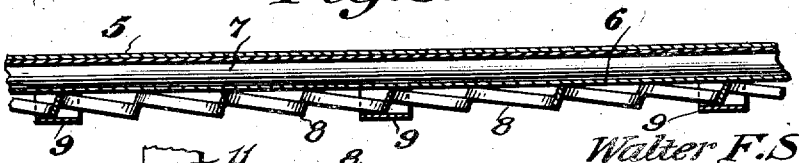

Figures 2 and 3 are respectively sectional views on the lines 2—2 and 3—3 of Figure 1.

Figure 4:
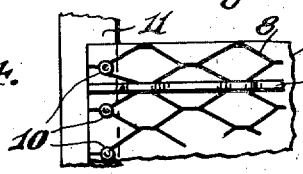

Figure 4 is a detail view illustrating the preferred form of fastening the foundation in place on a support.

In the disclosure, a backing board is employed, preferably of corrugated fibre or paper. As shown it consists of a backing sheet 5, a facing sheet 6, and an interposed corrugated core 7. This board, or at least the outer sheet 6, is substantially waterproofed.

Over the outer face of the outer sheet 6 is located a lathing sheet 8, which is preferably, though not necessarily, of expanded metal. The expanded metal sheet 8 is secured to the backing sheet or board by strips 9 which may be of fabric, cord or some suitable non-metallic material, but preferably paper. These may be laid in any direction over the metal fabric 8, and in the openings are pressed down as will be clear by reference to Figure 2, so that at intervals they are in contact with the outer face of the outer sheet 6, and these portions are secured by suitable adhesive to said backing board.

It will be noted by reference to Figures 1 and 4 that each strip 9 is narrower than the interstices or openings in the foraminous material held. It will also be noted by reference to Figure 3 that the strips 9 where they pass over the joined portions of the zig-zag strips that form the foraminous material are spaced from the facing sheet. As a consequence of the narrow strips the plaster will flow into the openings that are crossed by the strips and can pass under the portions of the strips and interlock with the portions of the foraminous sheet beneath them. The strips therefore do not materially interfere with the essential interlocking or keying action between the plaster and the foraminous lathing sheet.

Preferably the strips are substantially waterproofed and the adhesive is waterproof. Silica of soda has been found peculiarly effective for the purpose, not only because of its waterproof character, but because it dries quickly. Casein glue may be employed, and indeed it has been found that vegetable or animal glue or other adhesive can be satisfactorily utilized since the moisture of the plaster does not seem to pass readily between the adhering portions of the sheets, and the plaster will set before any separation can take place. More than that, the strips have really fulfilled their functions after the plaster has been applied, for when it sets, experience has demonstrated that it will adhere to the backing sheet so as to be actually supported thereby. Moreover in the preferred use of the board the metal lathing is itself preferably fastened to the supports. Thus, as indicated in Figure 4, nails having large heads 10 are driven through the board into the studding 11 and overlies the metal.

It will be seen that with this structure the surface of the backing sheet is unbroken by fasteners passing through it, except at the studding where it is backed by the latter, and consequently there are so openings by which moisture can gain access to the interior of the backing sheet between its points of support. A structure of this kind moreover can be readily manufactured either by hand or by machinery, any variation in the arrangement of the mesh of the metal lathing not affecting the application of the securing strips 9, which being flexible, will pass through the openings whenever they occur.

From the foregoing, it is thought that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

What I claim, is:

1. A plaster base comprising a substantially flat backing sheet, a substantially flat foraminous lathing sheet that lies flat against the backing sheet, and spaced strips of material extending over the lathing sheet and adhesively applied to the backing sheet at the openings on the lathing sheet and securing the lathing sheet to the backing sheet.

2 A plaster base comprising a backing sheet, a sheet of foraminous material located thereover, and means extending over the foraminous material and adhesively applied to the outer face of the backing sheet at openings in the foraminous material, said means being narrower than said openings across which it passes and leaving said openings and the material bounding them exposed.

3. A plaster base comprising a backing sheet, a sheet of expanded metal located thereover, and a uniting strip extending over the foraminous material and adhesively applied to the outer face of the backing sheet at openings in the expanded metal sheet, said strip being narrower than the openings at which it is secured and leaving the material of the expanded metal sheet beneath said strip exposed at the crossing points.

4. A plaster base comprising a backing sheet having its outer face substantially waterproofed, a foraminous metal sheet located over the said face of the sheet, and a plurality of flexible strips extending over the foraminous sheet and having portions thereof in the openings of the sheet adhesively secured to the backing sheet.

5. A plaster base comprising a backing sheet having its outer face substantially waterproofed, a foraminous metal sheet located over the said face of the sheet, and a plurality of flexible substantially waterproofed strips extending over the foraminous sheet and having portions thereof in the openings of the sheet secured to the waterproofed face of the backing sheet by substantially waterproofed adhesive.

WALTER F. SCHULZ.